UNITED STATES PATENT OFFICE.

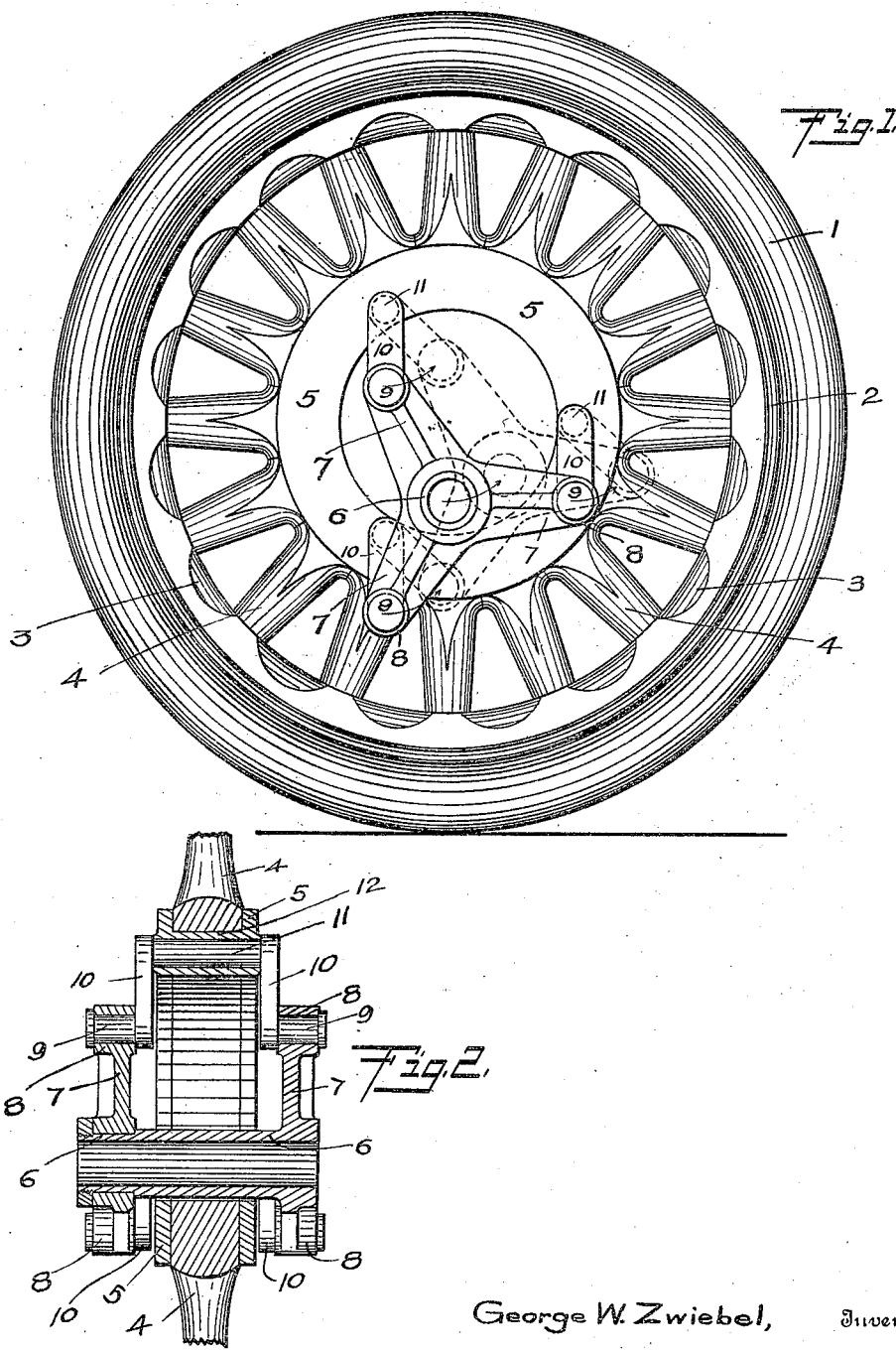

GEORGE W. ZWIEBEL, OF PAPILLION, NEBRASKA.

VEHICLE-WHEEL.

No. 840,985.

Specification of Letters Patent.

Patented Jan. 8, 1907.

Application filed March 12, 1906. Serial No. 305,698.

*To all whom it may concern:*

Be it known that I, GEORGE W. ZWIEBEL, a citizen of the United States, residing at Papillion, in the county of Sarpy and State of Nebraska, have invented certain new and useful Improvements in Vehicle-Wheels, of which the following is a specification.

My invention relates to vehicle-wheels; and it is the object thereof to provide a wheel for use on automobiles and the like which may be used either for the driving or steering wheels of the vehicle and in which the hub of the wheel, or that part connected with the axle of the vehicle, is connected with the remainder of the wheel in such manner that shocks and concussions caused by the wheel meeting with obstructions and irregularities in the road are greatly reduced and partly neutralized within the wheel itself instead of being transmitted thereby to the frame and springs of the vehicle.

A further object of my invention is to provide the connecting means between the hub and remainder of the wheel for the purpose above mentioned without the use of springs, cushions, or other elastic or resilient materials.

In the accompanying drawings, Figure 1 is a side elevation of a wheel embodying my invention, and Fig. 2 is a detail axial section thereof.

In the construction illustrated my invention is shown as applied to a wheel of the "artillery" type, such as are in common use on automobiles, the pneumatic tire 1, the tire-rim 2, the fellies 3, and spokes 4 all being of ordinary construction and arrangement. The spokes, however, instead of being connected directly to the hub of the wheel are made shorter than in the ordinary wheel of this type and are connected to the annulus 5. The hub 6 passes through the central opening of the annulus and at each side thereof is provided with the radially-extending equally-spaced arms 7. At the ends of said arms are formed bearings 8, through which pass the pins 9 of the cranks 10, which are carried on the ends of the shafts 11, journaled in suitable bearings 12 in the annulus 5, as shown in Fig. 2.

The cranks 10 are all of equal length, the distances from the center of the hub 6 to the centers of the bearings 8 and from the center of the annulus to the centers of the bearings 12 are all equal, and the centers of the bearings 8 and 12 are equiangularly spaced about the centers of the hub and annulus, respectively. The hub is thus held constantly at a position eccentric to the annulus, the amount of eccentricity being equal to the length of the cranks 10.

When the wheel is in use on a vehicle, the weight thereof normally holds the hub at a position below the center of the wheel, as shown in Fig. 1, such position being maintained as the wheel advances by rotation of the cranks 10, by which the hub is suspended. If, however, the wheel encounters obstructions or meets with unusual resistance to its advance, it may lag momentarily without stopping the advance of the hub, which may swing forward and upward in an arcurate path having a radius equal to the length of the cranks 10, the hub and its connections assuming the positions shown by dotted lines in Fig. 1, in which the direction of movement of the wheel is assumed to be to the right. By this forward swinging movement of the hub relative to the wheel any shock or concussion caused by engagement of the wheel with an obstacle is materially reduced, if not entirely neutralized, instead of being transmitted to the vehicle-frame, as it would be by the ordinary rigid wheel. The springs of the vehicle are thus relieved of end thrust due to such shocks or concussions, and the vertical movement of the vehicle-frame in passing over obstructions is made less abrupt and perceptible, because such vertical movement is made in combination with a greater horizontal component.

It will be obvious that the details of construction shown and described may be changed and modified without departing from the spirit of my invention. As an example of such possible modification ball or roller bearings may be used throughout instead of the plain bearings shown.

Now, having described my invention, what I claim, and desire to secure by Letters Patent, is—

1. In a wheel, an annulus held concentrically with the wheel-rim, a hub passing through the annulus eccentrically thereto, shafts journaled in the annulus, cranks carried by said shafts, and pins carried by said cranks and having a journaled connection with the hub.

2. In a wheel, a plurality of bearings spaced equidistantly upon a circle concentric with the wheel-rim, shafts journaled in said bearings, a hub, and cranks carried by the shafts and connecting with bearings upon the hub spaced the same as the shaft-bearings.

3. In a wheel, an annulus held concentrically with the wheel-rim, a hub passing through the annulus eccentrically thereto, and a plurality of cranks having journaled connections in the hub and annulus and adapted to maintain the hub constantly at such eccentric position with relation to the annulus.

4. A wheel having a concentric axial opening, a plurality of shafts journaled adjacent said axial opening, a hub passing through said opening, radial arms carried by the hub, bearings formed in said arms, and a plurality of cranks carried by the shafts, the pins of said cranks entering the bearings in the radial arms of the hub, the cranks all being of equal length, the distances from the center of the axial opening in the wheel to the centers of the shafts and from the center of the hub to the centers of the bearings in the radial arms all being equal, and the shafts and the bearings in the arms respectively being equiangularly spaced about the centers of the axial opening and the hub.

In testimony whereof I have hereunto affixed my signature in the presence of two witnesses.

GEORGE W. ZWIEBEL.

Witnesses:
 DAVID S. FASE,
 LOUIS LESIEUR.